(12) United States Patent
Gottlieb

(10) Patent No.: US 9,733,333 B2
(45) Date of Patent: Aug. 15, 2017

(54) SYSTEMS AND METHODS FOR MONITORING PARTICIPANT ATTENTIVENESS WITHIN EVENTS AND GROUP ASSORTMENTS

(71) Applicant: SHINDIG, INC., New York, NY (US)

(72) Inventor: Steven M. Gottlieb, New York, NY (US)

(73) Assignee: SHINDIG, INC., New York, NY (US)

( * ) Notice: Subject to any disclaimer, the term of this patent is extended or adjusted under 35 U.S.C. 154(b) by 380 days.

(21) Appl. No.: 14/272,590

(22) Filed: May 8, 2014

(65) Prior Publication Data

US 2015/0326458 A1   Nov. 12, 2015

(51) Int. Cl.
| | | |
|---|---|---|
| *G06F 15/173* | (2006.01) | |
| *G01S 3/802* | (2006.01) | |
| *H04L 12/26* | (2006.01) | |
| *H04R 3/00* | (2006.01) | |
| *G01S 3/808* | (2006.01) | |
| *H04L 12/18* | (2006.01) | |

(52) U.S. Cl.
CPC ............ *G01S 3/802* (2013.01); *G01S 3/8083* (2013.01); *H04L 12/1831* (2013.01); *H04L 43/04* (2013.01); *H04L 43/0876* (2013.01); *H04R 3/005* (2013.01)

(58) Field of Classification Search
CPC ..... H04L 43/0876; H04L 43/04; H04R 3/005; G01S 3/8083
See application file for complete search history.

(56) References Cited

U.S. PATENT DOCUMENTS

| | | | |
|---|---|---|---|
| 6,044,146 A | 3/2000 | Gisby et al. | |
| 6,241,612 B1 | 6/2001 | Heredia | |
| 6,259,471 B1 | 7/2001 | Peters et al. | |
| 6,515,681 B1 | 2/2003 | Knight | |
| 6,559,863 B1 | 5/2003 | Megiddo | |

(Continued)

FOREIGN PATENT DOCUMENTS

| | | |
|---|---|---|
| CA | 2771785 | 3/2011 |
| CA | 2774014 | 4/2011 |

(Continued)

OTHER PUBLICATIONS

Cisco (Cisco WebEx, WebEx Event Center Users Guide, Version 6.5, Last updated: 072310-IC Last updated: 111810, retrieved on Mar. 2, 2016 from https://www.ieee.org/about/volunteers/remote_conferencing/webex_event_center_user_guide.pdf).*

(Continued)

*Primary Examiner* — Tauqir Hussain
*Assistant Examiner* — Michael A Keller
(74) *Attorney, Agent, or Firm* — Robert W. Morris; Eckert Seamans Cherin & Mellott, LLC

(57) ABSTRACT

Systems, methods, and non-transitory computer readable medium are described for monitoring participant attentiveness within events and for group assortments. In some embodiments, communications received from an online participant of an event may be monitored. Based on the monitored communications, a steady state level may be determined. Changes within the monitored communications from the steady state level may be detected and then stored within an event participation log.

8 Claims, 14 Drawing Sheets

(56) References Cited

U.S. PATENT DOCUMENTS

| | | |
|---|---|---|
| 6,654,346 B1 | 11/2003 | Mahalingaiah et al. |
| 6,697,614 B2 | 2/2004 | Dorenbosch |
| 7,007,235 B1 | 2/2006 | Hussein |
| 7,478,129 B1 | 1/2009 | Chemtob |
| 7,487,211 B2 | 2/2009 | Beavers et al. |
| 7,495,687 B2 | 2/2009 | DuMas et al. |
| 7,515,560 B2 | 4/2009 | DuMas et al. |
| 7,593,032 B2 | 9/2009 | Civanlar et al. |
| 7,787,447 B1 | 8/2010 | Egan et al. |
| 8,060,560 B2 | 11/2011 | Vonog et al. |
| 8,144,187 B2 | 3/2012 | Moore et al. |
| 8,171,154 B2 | 5/2012 | Vonog et al. |
| 8,225,127 B2 | 7/2012 | Vonog et al. |
| 8,230,355 B1 | 7/2012 | Bauermeister |
| 8,390,670 B1 | 3/2013 | Gottlieb |
| 8,405,702 B1 | 3/2013 | Gottlieb |
| 8,429,704 B2 | 4/2013 | Vonog et al. |
| 8,458,328 B2 | 6/2013 | Dubovik et al. |
| 8,463,677 B2 | 6/2013 | Vonog et al. |
| 8,527,654 B2 | 9/2013 | Vonog et al. |
| 8,549,167 B2 | 10/2013 | Vonog et al. |
| 8,558,868 B2 | 10/2013 | Prentice |
| 8,635,293 B2 | 1/2014 | Fisher |
| 8,647,206 B1 | 2/2014 | Gottlieb |
| 8,749,610 B1 | 6/2014 | Gossweiler |
| 8,779,265 B1 | 7/2014 | Gottlieb |
| 8,902,272 B1 | 12/2014 | Gottlieb |
| 8,917,310 B2 | 12/2014 | Gottlieb |
| 8,929,516 B2 | 1/2015 | Odinak |
| 9,215,412 B2 | 12/2015 | Gottlieb |
| 9,241,131 B2 | 1/2016 | Desai |
| 2002/0094831 A1 | 7/2002 | Maggenti et al. |
| 2002/0102999 A1 | 8/2002 | Maggenti et al. |
| 2002/0143877 A1 | 10/2002 | Hackbarth |
| 2004/0022202 A1 | 2/2004 | Yang |
| 2005/0032539 A1 | 2/2005 | Noel et al. |
| 2005/0132288 A1 | 6/2005 | Kirn et al. |
| 2005/0262542 A1 | 11/2005 | DeWeese et al. |
| 2006/0002315 A1 | 1/2006 | Theurer |
| 2006/0055771 A1 | 3/2006 | Kies |
| 2006/0063555 A1 | 3/2006 | Robbins |
| 2006/0114314 A1 | 6/2006 | Dunko |
| 2006/0140138 A1 | 6/2006 | Hill |
| 2007/0186171 A1 | 8/2007 | Junozovic |
| 2007/0234220 A1 | 10/2007 | Khan |
| 2007/0265074 A1 | 11/2007 | Akahori et al. |
| 2008/0002668 A1 | 1/2008 | Asokan et al. |
| 2008/0037763 A1 | 2/2008 | Shaffer et al. |
| 2008/0136898 A1 | 6/2008 | Eisenberg et al. |
| 2008/0137559 A1 | 6/2008 | Sasaki et al. |
| 2008/0146339 A1 | 6/2008 | Olsen et al. |
| 2008/0181260 A1 | 7/2008 | Vonog et al. |
| 2008/0274810 A1 | 11/2008 | Hayashi et al. |
| 2008/0320082 A1* | 12/2008 | Kuhlke ............... H04L 12/1822<br>709/205 |
| 2009/0033737 A1 | 2/2009 | Goose et al. |
| 2009/0040289 A1 | 2/2009 | Hetherington et al. |
| 2009/0204906 A1 | 8/2009 | Irving |
| 2009/0209339 A1 | 8/2009 | Okada |
| 2009/0210789 A1 | 8/2009 | Thakkar |
| 2009/0249244 A1 | 10/2009 | Robinson et al. |
| 2009/0254843 A1 | 10/2009 | Van Wie |
| 2009/0288007 A1 | 11/2009 | Leacock |
| 2010/0005411 A1 | 1/2010 | Duncker |
| 2010/0026780 A1 | 2/2010 | Tico et al. |
| 2010/0026802 A1 | 2/2010 | Titus et al. |
| 2010/0030578 A1 | 2/2010 | Siddique et al. |
| 2010/0122184 A1 | 5/2010 | Vonog et al. |
| 2010/0131868 A1 | 5/2010 | Chawla |
| 2010/0146085 A1 | 6/2010 | Van Wie |
| 2010/0316232 A1 | 12/2010 | Acero et al. |
| 2011/0055317 A1 | 3/2011 | Vonog et al. |
| 2011/0060992 A1 | 3/2011 | Jevons |
| 2011/0072366 A1 | 3/2011 | Spencer et al. |
| 2011/0078532 A1 | 3/2011 | Vonog et al. |
| 2011/0164141 A1 | 7/2011 | Tico et al. |
| 2011/0185286 A1 | 7/2011 | Moyers |
| 2011/0209104 A1 | 8/2011 | Hinckley et al. |
| 2011/0258474 A1 | 10/2011 | Vonog et al. |
| 2011/0270922 A1 | 11/2011 | Jones |
| 2011/0279634 A1 | 11/2011 | Periyannan |
| 2012/0002001 A1 | 1/2012 | Prentice |
| 2012/0038550 A1 | 2/2012 | Lemmey et al. |
| 2012/0039382 A1 | 2/2012 | Vonog et al. |
| 2012/0041859 A1 | 2/2012 | Vonog et al. |
| 2012/0060101 A1 | 3/2012 | Vonog et al. |
| 2012/0084456 A1 | 4/2012 | Vonog et al. |
| 2012/0084672 A1 | 4/2012 | Vonog et al. |
| 2012/0084682 A1 | 4/2012 | Sirpal |
| 2012/0098919 A1 | 4/2012 | Tang |
| 2012/0110162 A1 | 5/2012 | Dubovik et al. |
| 2012/0110163 A1 | 5/2012 | Dubovik et al. |
| 2012/0124128 A1 | 5/2012 | Vonog et al. |
| 2012/0127183 A1 | 5/2012 | Vonog et al. |
| 2012/0151541 A1 | 6/2012 | Vonog et al. |
| 2012/0182384 A1 | 7/2012 | Anderson |
| 2012/0192087 A1 | 7/2012 | Lemmey |
| 2012/0198334 A1 | 8/2012 | Surin et al. |
| 2012/0246227 A1 | 9/2012 | Vonog et al. |
| 2012/0249719 A1 | 10/2012 | Lemmey et al. |
| 2012/0254649 A1 | 10/2012 | Vonog et al. |
| 2012/0272162 A1 | 10/2012 | Surin et al. |
| 2012/0280905 A1 | 11/2012 | Vonog et al. |
| 2012/0293600 A1 | 11/2012 | Lemmey et al. |
| 2012/0297320 A1 | 11/2012 | Lemmey et al. |
| 2012/0326866 A1 | 12/2012 | Lemmey et al. |
| 2012/0331089 A1 | 12/2012 | Vonog et al. |
| 2012/0331387 A1 | 12/2012 | Lemmey et al. |
| 2013/0014027 A1 | 1/2013 | Lemmey |
| 2013/0014028 A1 | 1/2013 | Lemmey et al. |
| 2013/0018960 A1 | 1/2013 | Knysz et al. |
| 2013/0019184 A1 | 1/2013 | Vonog et al. |
| 2013/0021431 A1 | 1/2013 | Lemmey et al. |
| 2013/0024785 A1 | 1/2013 | Van Wie |
| 2013/0063542 A1 | 3/2013 | Bhat |
| 2013/0073978 A1 | 3/2013 | Butler |
| 2013/0088518 A1 | 4/2013 | Lemmey et al. |
| 2013/0097512 A1 | 4/2013 | Hong et al. |
| 2013/0123019 A1 | 5/2013 | Sullivan |
| 2013/0156093 A1 | 6/2013 | Vonog et al. |
| 2013/0169742 A1 | 7/2013 | Wu |
| 2013/0173531 A1 | 7/2013 | Rinearson |
| 2013/0191479 A1 | 7/2013 | Gottlieb |
| 2013/0201279 A1 | 8/2013 | Civinlar et al. |
| 2013/0216206 A1 | 8/2013 | Dubin |
| 2013/0239063 A1 | 9/2013 | Ubillos et al. |
| 2013/0254287 A1 | 9/2013 | Biswas |
| 2013/0289983 A1 | 10/2013 | Park |
| 2013/0321648 A1 | 12/2013 | Tamya |
| 2014/0004496 A1 | 1/2014 | Reddy |
| 2014/0019882 A1 | 1/2014 | Chew et al. |
| 2014/0040784 A1 | 2/2014 | Behforooz et al. |
| 2014/0176665 A1* | 6/2014 | Gottlieb ............... H04N 7/15<br>348/14.08 |
| 2014/0184723 A1 | 7/2014 | Morrison |
| 2014/0229888 A1 | 8/2014 | Ko et al. |
| 2014/0325428 A1 | 10/2014 | Lee et al. |
| 2015/0025888 A1* | 1/2015 | Sharp ............... G10L 17/00<br>704/246 |
| 2015/0046800 A1 | 2/2015 | Isidore et al. |
| 2015/0049885 A1* | 2/2015 | Oestlund ............... G06F 3/165<br>381/123 |
| 2015/0052453 A1 | 2/2015 | Yu et al. |
| 2015/0106750 A1 | 4/2015 | Konami |
| 2015/0365305 A1* | 12/2015 | Namata ............... H04L 43/04<br>705/14.54 |

FOREIGN PATENT DOCUMENTS

| | | |
|---|---|---|
| EP | 0721726 | 12/2000 |
| EP | 2471221 | 7/2012 |
| EP | 2484091 | 8/2012 |
| EP | 2630630 | 8/2013 |

(56) References Cited

FOREIGN PATENT DOCUMENTS

| | | |
|---|---|---|
| EP | 2636194 | 9/2013 |
| GB | 2446529 | 8/2008 |
| WO | 2009077936 | 6/2009 |
| WO | 2011025989 | 3/2011 |
| WO | 2011041229 | 4/2011 |
| WO | 2012021173 | 2/2012 |
| WO | 2012021174 | 2/2012 |
| WO | 2012021901 | 2/2012 |
| WO | 2012054089 | 4/2012 |
| WO | 2012054895 | 4/2012 |
| WO | 2012060977 | 5/2012 |
| WO | 2012060978 | 5/2012 |
| WO | 2012103376 | 8/2012 |
| WO | 2012135384 | 10/2012 |
| WO | 2012151471 | 11/2012 |
| WO | 2012177641 | 12/2012 |
| WO | 2012177779 | 12/2012 |
| WO | 2013343207 | 3/2013 |
| WO | 2013149079 | 10/2013 |

OTHER PUBLICATIONS

Cisco2 (Userguide Cisco WebEx Audio Controls Guide and Release Notes for FR29, retrieved on Sep. 1, 2016 using way back machine dated May 14, 2013, retrieved from https://web.archive.org/web/20130514031844/http://www.meetingconnect.net/files/CiscoWebExAudioControlsandReleaseNotes.pdf).*
About TokBox, Inc., All about TokBox, http://www.tokbox.com/about, retrieved Feb. 4, 2011, p. 1.
CrunchBase Profile, CrunchBase readeo, http://www.crunchbase.com/company/readeo, retrieved Feb. 3, 2011, pp. 1-2.
CrunchBase Profile, CrunchBase Rounds, http://www.crunchbase.com/company/6rounds, retrieved Feb. 4, 2011, pp. 1-2.
CrunchBase Profile, CrunchBase TokBox, http://www.crunchbase.com/company/tokbox, retrieved Feb. 4, 2011, pp. 1-3.
Online Collaboration GoToMeeting, http://www.gotomeeting.com/fec/online_collaboration, retrieved Feb. 4, 2011, pp. 1-4.
Readeo Press Release, http://www.mmpublicity.com, Feb. 25, 2010, pp. 1-2.
Rounds.com, Make friends online and enjoy free webcame chats, http://www.rounds.com/about, retrieved Feb. 4, 2011, pp. 1-3.
2011 Blackboard Collaborate User's Guide.
2007 WebEx Meeting Center User's Guide.
MacDonald, Heidi—Shindig Offers Authors Interactive Video Conferencing—Blog posted Sep. 12, 2012—Publishers Weekly. Retrieved from [http://publishersweekly.com] on [Aug. 15, 2016]. 5 Pages.
Shindig, Various Informational Pages Published as of Jul. 21, 2012—Retrieved via Internet Archive from [http://shindigevents.com] on [Aug. 5, 2016].
Slideshare—Shindig Magazine Video Chat Events. Slide Presentation published Oct. 9, 2012. Retrieved from [http://slideshart.net] on [Aug. 11, 2016]. 11 Pages.

* cited by examiner

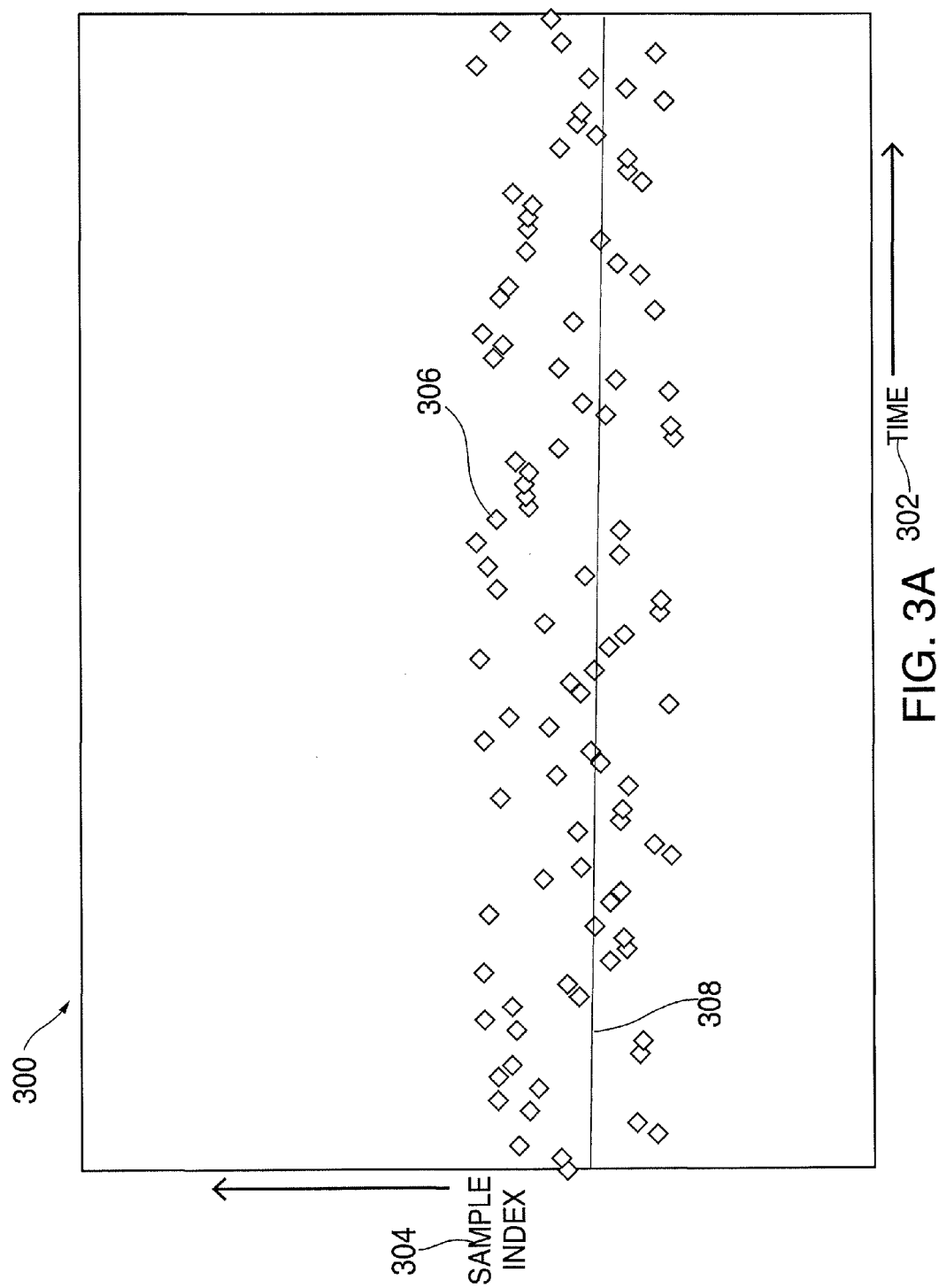

SYSTEMS AND METHODS FOR MONITORING PARTICIPANT ATTENTIVENESS WITHIN EVENTS AND GROUP ASSORTMENTS

FIELD OF THE INVENTION

This generally relates to systems and methods for monitoring participant attentiveness within events and for group assortments.

BACKGROUND OF THE INVENTION

Online events, such as online classes, are quickly growing in popularity and abundance. What previously could only occur within a physical location (e.g., a classroom), may now be accessible from the comforts of one's home. This has tremendous benefits for many individuals, as it allows people to not miss events due to a variety of conditions (e.g., illness, weather, etc.). Furthermore, the number of individuals capable of accessing events may now grow larger than any physical location could accommodate, with the individuals only needing a network connection to "attend" an event.

As an illustrative example, many school systems are implementing online classrooms to help eliminate "snow days" from occurring. Although most children loathe the idea of no more snow days, this comes as a tremendous advantage to the educational system because course materials may now be disseminated regardless of whether or not the school is open. However, as useful as online classes may be, inherent issues may arise from a student working from home and on their personal computer. For example, students attending an online class may also be able to surf the web and/or access one or more social media networks. As another example, students may have an online classroom running in the background and may play a video game or may converse with one or more family members or friends. This may be a costly problem in that students will not participant fully in the event and the event administrators (e.g., teachers) have little to no way of detecting such a situation.

Thus, it would be beneficial for there to be systems and methods that allow for participants of online events to be monitored to determine participation and attentiveness levels.

SUMMARY OF THE INVENTION

Systems, methods, and non-transitory computer readable media for monitoring participant attentiveness within events and for group assortments are provided. Such methods may include monitoring communications for online participants of an event, determining steady state levels of the communications, detecting changes within the monitored communications, and storing the changes in an event participant log. To determine the steady state level, the communications may be monitored for a period of time and modeled so that changes corresponding to physical events rather than random fluctuations may be discerned from random fluctuations. Changes exceeding a predefined threshold, such as three standard deviations from the modeled data, may signify a "real" change within the communications, whereas changes smaller than the predefined threshold may be classified as non-relevant anomalies. In some embodiments, event statistics may be assigned to each online participant based on the stored changes. For example, a user who has been determined to not be paying attention may receive a low participation score or grade, whereas a user who has actively participated in the event may receive a high participation score.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 3A is an illustrative graph of a steady state participation level in accordance with various embodiments;

DETAILED DESCRIPTION OF THE INVENTION

The present invention may take form in various components and arrangements of components, and in various techniques, methods, or procedures and arrangements of steps. The referenced drawings are only for the purpose of illustrated embodiments, and are not to be construed as limiting the present invention. Various inventive features are described below that can each be used independently of one another or in combination with other features.

Figure 1:
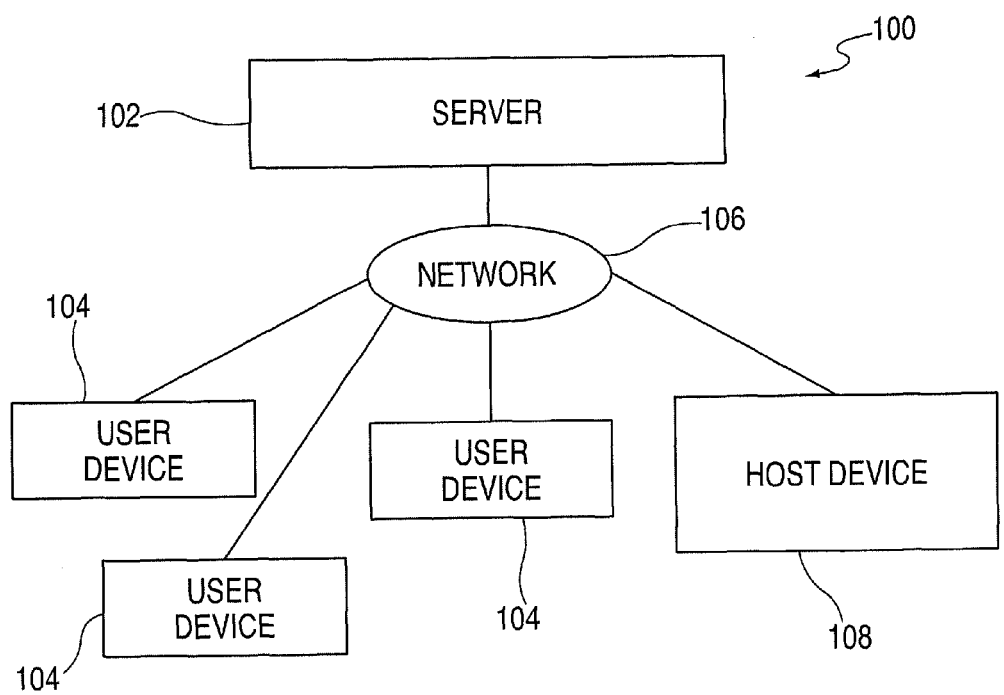
FIG. 1 is a block diagram depicting a system in accordance with various embodiments.

FIG. 1 is a block diagram depicting a system in accordance with various embodiments. System 100 may include server 102, user devices 104, and host device 108, which may communicate with one another across network 106. Although only three user devices 104, one host device 108, and one server 102 are shown within FIG. 1, persons of ordinary skill in the art will recognize that any number of user devices, host devices, and servers may be used.

Server 102 may be any number of servers capable of facilitating communications and/or servicing requests from user devices 104 and/or host device 108. User device 104 may send and/or receive data from server 102 and/or host device 108 via network 106. Similarly, host device 108 may send and/or receive data from server 102 and/or user devices 104 via network 106. In some embodiments, network 106 may facilitate communications between one or more user devices 104.

Network 106 may correspond to any network, combination of networks, or network devices that may carry data communications. For example, network 106 may be any one or any combination of local area networks ("LAN"), wide area networks ("WAN"), telephone networks, wireless networks, point-to-point networks, star networks, token ring networks, hub networks, or any other type of network, or any combination thereof. Network 106 may support any number of protocols such as Wi-Fi (e.g., 802.11 protocol), Bluetooth®, radio frequency systems (e.g., 900 MHZ, 1.4. GHZ, and 5.6 GHZ communication systems), cellular networks (e.g., GSM, AMPS, GPRS, CDMA, EV-DO, EDGE, 3GSM, DECT, IS-136/TDMA, iDen, LTE, or any other suitable cellular network protocol), infrared, TCP/IP (e.g., any of the protocols used in each of the TCP/IP layers), HTTP, BitTorrent, FTP, RTP, RTSP, SSH, Voice over IP ("VOIP"), or any other communications protocol, or any combination thereof. In some embodiments, network 106 may provide wired communications paths for user devices 104 and/or host device 108.

User devices 104 may correspond to any electronic device or system capable of communicating over network 106 with server 102, host device 108, and/or with one or more additional user devices 104. For example, user devices 104 may be portable media players, cellular telephones, pocket-sized personal computers, personal digital assistants ("PDAs"), desktop computers, laptop computers, and/or tablet computers. User devices 104 may include one or more processors, storage, memory, communications circuitry, input/output interfaces, as well as any other suitable feature. Furthermore, one or more components of user device 104 may be combined or omitted.

Host device 108 may correspond to any electronic device or system capable of communicating over network 106 with server 102 and/or user devices 104. For example, host device 108 may be a portable media player, cellular telephone, pocket-sized personal computer, personal digital assistant ("PDA"), desktop computer, laptop computer, and/or tablet computer. In some embodiments, host device 108 may be substantially similar to user devices 104, and the previous description may apply. In some embodiments, one or more additional host devices may be included within system 100 and/or host device 108 may be omitted from system 100.

Although examples of embodiments may be described for a user-server model with a server servicing requests of one or more user applications, persons of ordinary skill in the art will recognize that any other model (e.g., peer-to-peer), may be available for implementation of the described embodiments. For example, a user application executed on user device 104 may handle requests independently and/or in conjunction with server 102.

Figure 2:
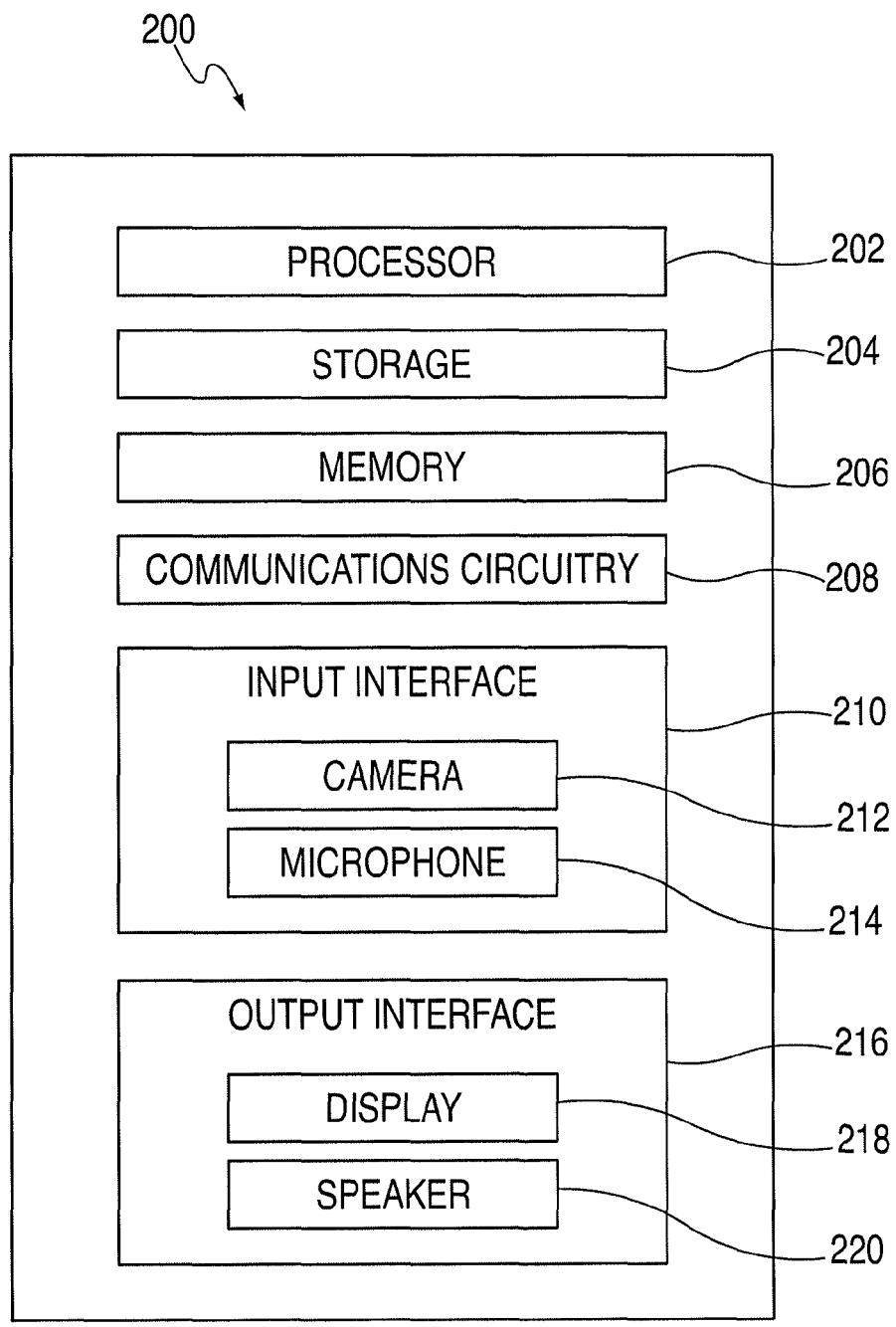
FIG. 2 is an illustrative block diagram of a device in accordance with various embodiments.

FIG. 2 is an illustrative block diagram of a device in accordance with various embodiments. Device 200 may, in some embodiments, correspond to one of user devices 104 and/or host device 108 of FIG. 1. Persons of ordinary skill in the art will recognize that device 200 is merely one example of a device that may be implanted within a server-device system, and it is not limited to being only one part of the system. Furthermore, one or more components included within device 200 may be added and/or omitted.

In some embodiments, device 200 may include processor 202, storage 204, memory 206, communications circuitry 208, input interface 210, and output interface 216. Input interface 210 may, in some embodiments, include camera 212 and microphones 214. Output interface 216 may, in some embodiments, include display 218 and speaker 220. In some embodiments, one or more of the previously mentioned components may be combined or omitted, and/or one or more components may be added. For example, memory 204 and storage 206 may be combined into a single element for storing data. As another example, device 200 may additionally include a power supply, a bus connector, or any other additional component. In some embodiments, device 200 may include multiple instances of one or more of the components included therein. However, for the sake of simplicity only one of each component has been shown in FIG. 2.

Processor 202 may include any processing circuitry, such as one or more processors capable of controlling the operations and functionality of device 200. In some embodiments, processor 202 may facilitate communications between various components within device 202. Processor 202 may run the device's operation system, applications resident on the device, firmware applications, media applications, and/or any other type of application, or any combination thereof. In some embodiments, processor 202 may process one or more inputs detected by device 200 and perform one or more actions in response to the detected inputs.

Storage 204 may include one or more storage mediums. Various types of storage mediums may include, but are not limited to, hard-drives, solid state drives, flash memory, permanent memory (e.g., ROM), or any other storage type, or any combination thereof. Any form of data or content may be stored within storage 204, such as photographs, music files, videos, contact information, applications, documents, or any other file, or any combination thereof. Memory 206 may include cache memory, semi-permanent memory (e.g., RAM), or any other memory type, or any combination thereof. In some embodiments, memory 206 may be used in place of and/or in addition to external storage for storing data on device 200.

Communications circuitry 208 may include any circuitry capable of connecting to a communications network (e.g., network 106) and/or transmitting communications (voice or data) to one or more devices (e.g., user devices 104 and/or host device 108) and/or servers (e.g., server 102). Communications circuitry 208 may interface with the communications network using any suitable communications protocol including, but not limited to, Wi-Fi (e.g., 802.11 protocol), Bluetooth®, radio frequency systems (e.g., 900 MHz, 1.4 GHz, and 5.6 GHz communications systems), infrared, GSM, GSM plus EDGE, CDMA, quadband, VOIP, or any other protocol, or any combination thereof.

Input interface 210 may include any suitable mechanism or component for receiving inputs from a user operating device 200. Input interface 210 may also include, but is not limited to, an external keyboard, mouse, joystick, microphone, musical interface (e.g., musical keyboard), or any other suitable input mechanism, or any combination thereof.

In some embodiments, user interface 210 may include camera 212. Camera 212 may correspond to any image capturing component capable of capturing images and/or videos. For example, camera 212 may capture photographs, sequences of photographs, rapid shots, videos, or any other type of image, or any combination thereof. In some embodiments, device 200 may include one or more instances of camera 212. For example, device 200 may include a front-facing camera and a rear-facing camera. Although only one camera is shown in FIG. 2 to be within device 200, persons of ordinary skill in the art will recognize that any number of cameras, and any camera type may be included.

In some embodiments, device 200 may include microphones 214. Microphones 214 may be any component capable of detecting audio signals. For example, microphones 214 may include one more sensors for generating electrical signals and circuitry capable of processing the generated electrical signals. In some embodiments, microphones 214 may correspond to multiple microphones, such as a first microphone and a second microphone. In some embodiments, device 200 may include multiple microphones capable of detecting various frequency levels (e.g., high-frequency microphone, low-frequency microphone, etc.). In some embodiments, device 200 may include one or external microphones connected thereto and used in conjunction with, or instead of, microphones 214.

Output interface 216 may include any suitable mechanism or component for generating outputs from a user operating device 200. In some embodiments, output interface 216 may include display 218. Display 218 may correspond to any type of display capable of presenting content to a user and/or on a device. Display 218 may be any size and may be located on one or more regions/sides of device 200. For example, display 218 may fully occupy a first side of device 200, or may occupy a portion of the first side. Various display types may include, but are not limited to, liquid crystal displays ("LCD"), monochrome displays, color graphics adapter ("CGA") displays, enhanced graphics adapter ("EGA") displays, variable graphics array ("VGA") displays, or any other display type, or any combination thereof. In some embodiments, display 218 may be a touch screen and/or an interactive display. In some embodiments, the touch screen may include a multi-touch panel coupled to processor 202. In some embodiments, display 218 may be a touch screen and may include capacitive sensing panels. In some embodiments, display 218 may also correspond to a component of input interface 210, as it may recognize touch inputs.

In some embodiments, output interface 216 may include speaker 220. Speaker 220 may correspond to any suitable mechanism for outputting audio signals. For example, speaker 220 may include one or more speaker units, transducers, or array of speakers and/or transducers capable of broadcasting audio signals and audio content to a room where device 200 may be located. In some embodiments, speaker 220 may correspond to headphones or ear buds capable of broadcasting audio directly to a user.

FIG. 3A is an illustrative graph of a steady state participation level in accordance with various embodiments. Graph 300 is a two-dimensional graph of data plotted over time. Graph 300 may include first axis 302 and second axis 304. In some embodiments, first axis 302 may be a time axis. As data is obtained, the time associated with the data increases. For example, data captured closer to the begin of a measurement, run, or data acquisition time period, may have a lower or smaller time value along axis 302 than data captured later on. In some embodiments, second axis 304 may be a sample index axis. A sample index may correspond to any type of data unit to be captured. For example, graph 300 may correspond to a magnitude of audio detected by one or more microphones. In this scenario, lower values of data along axis 304 may correspond to lower levels of audio detected, whereas higher values may correspond to higher levels of audio detected. Persons of ordinary skill in the art will recognize that any unit may be used for axis 304 including, but not limited to, decibel level, microphone directionality offset, outputted volume, or any other unit, or any combination thereof.

Graph 300 may also include data points 306. Data points 306 may correspond to data obtained or produced by a user device, a host device, and/or a server, over a period of time. In some embodiments, data points 306 may correspond to a level of audio produced by a user and captured by a user device. In some embodiments, data points 306 may correspond to a level of audio produced by multiple user devices accessing an online event, such as a classroom.

In some embodiments, data points 306 may be obtained over the course of a period of time to determine a steady state level of sound or noise within an event or area. For example, in order to determine an average amount of noise within a room, a user device may record sound within the room for a period of time. This may allow the device to determine the average sound level within the room. In some embodiments, a model fit of the data may be generated to determine the steady state level over the period of time. For example, fit 308 may be generated to model data points 306. Fit 308 may represent the steady state level of the data over the period of time graphed within graph 300.

The model fit may allow for extrapolation to other periods of time. This may allow the user device and/or the server to determine whether any new sounds exceed the "average level of noise" based on the model fit of the data. Persons of ordinary skill in the art will recognize that any model fit, and/or any data modeling technique may be used to determine the steady state level of data points 306, and the aforementioned use of an average is merely exemplary. In fact, fit 308 may, in some embodiments, correspond to an exponential fit of data 306 or a linear fit of data 306, however higher order polynomials, moving averages, random samplings, and/or maximum likelihood functions, may be used.

As shown within graph 300, fit 308 may indicate an average level of data points 306 over a period of time. In some embodiments, the data points may all fall within a certain "error margin" of fit 308. For example, data points 306 may all fall within one or more standard deviations, σ, of fit 308. Typically, the formula used to determine standard deviation is:

$$\sigma = \sqrt{\frac{1}{N}\sum_{i=1}^{N}(x_i - \mu)^2},\qquad \text{Equation 1}$$

where N corresponds to the total number of data points, i corresponds to each individual data point, and μ corresponds to the average data point typically found by summing all data points and dividing by the number of data points.

In some embodiments, if a captured data point exceeds a predefined number of standard deviations from the mean, then that data point may not fall within expected fluctuations of the data. For this reason, typically the larger the data acquisition, the more accurate the model, and therefore the more confident one may be, that a point may be an outlier.

Figure 3B:
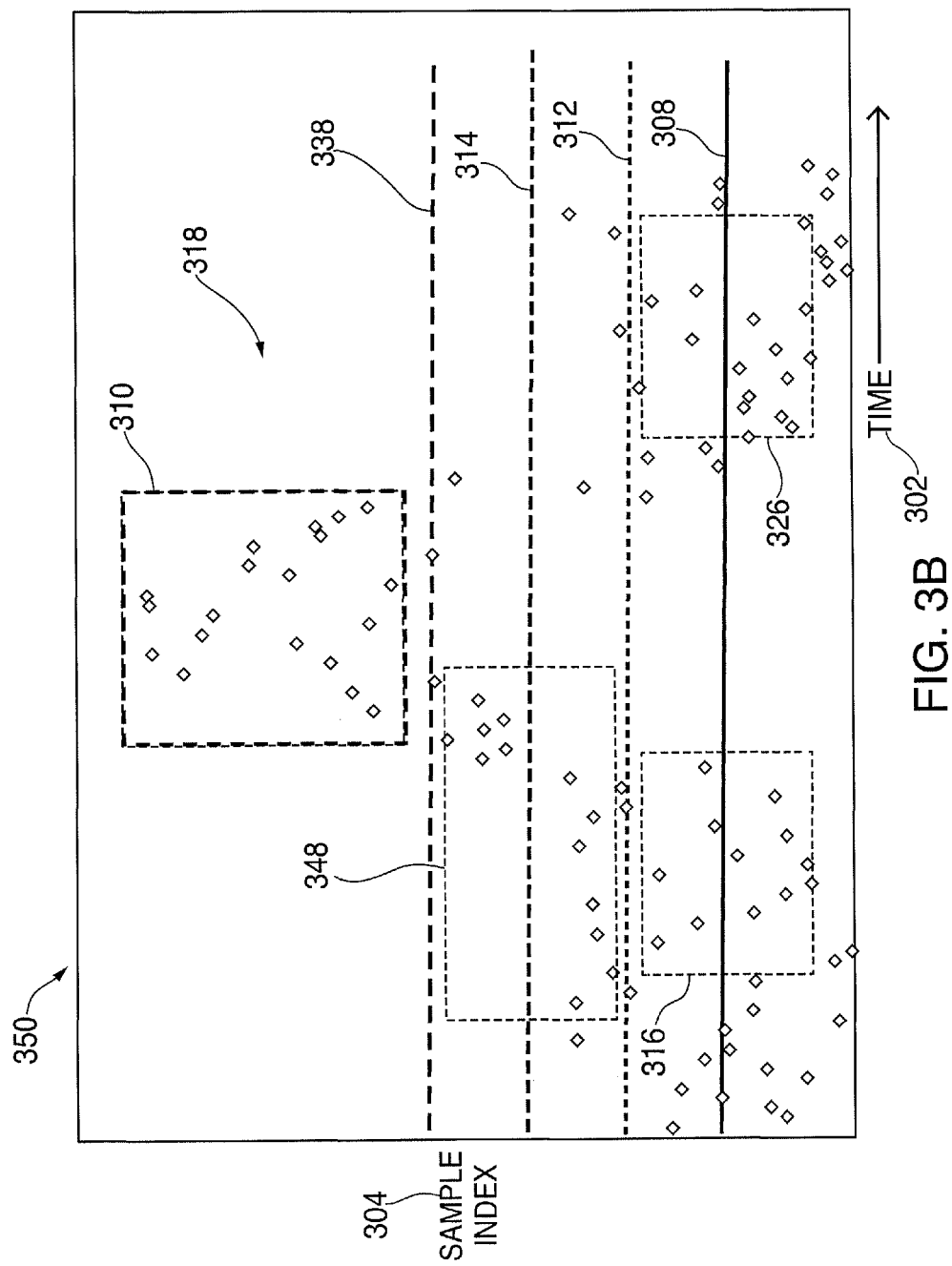
FIG. 3B is an illustrative graph of a detected change within monitored communications in accordance with various embodiments.

FIG. 3B is an illustrative graph of a detected change within monitored communications in accordance with various embodiment. In some embodiments, graph 350 of FIG. 3B may be substantially similar to graph 300 of FIG. 3A, with the exception that graph 350 may correspond to data points exceeding a predefined threshold. Graph 350 may include first axis 302 and second axis 304, which may, in some embodiments, be substantially similar to first axis 302 and second axis 304 of FIG. 3A, and the previous description of the latter may apply to the former.

Graph 350 may include data points 318. In some embodiments, data points 318 may substantially similar to data points 306 of FIG. 3A, with the exception that data points 318 may include one or more data points indicating a change in the received data above a predefined threshold value. In some embodiments, data points 318 may be described in four (4) groupings of data points. Data points 316 may correspond to a first grouping of data points corresponding to an earlier period of time when data was acquired. Data points 316 may correspond to a grouping of data located about model fit 308 obtained from fitting data points 306 of FIG. 3A. In some embodiments, because data points 316 are located about model fit 308, they may be considered "background" data. For example, data points 316 may all fall within a region defined by model fit 308 and one standard deviation threshold line 312. This may correspond to data points 316 all having values less than one standard deviation from fit 308. In some embodiments, data points 326, which may be a second grouping of data points 318, may be substantially similar to data points 316, with the exception that the former may be acquired later in time than the former.

First standard deviation line 312 may, in some embodiments, be included within graph 350. Line 312 may correspond to one unit of standard deviation (see Equation 1), based on data points 306. Typically, data found to be within one standard deviation of the mean is statistically indiscernible from the mean. This is because if the data follows a normal distribution, approximately 68% of the data values will fall within one standard deviation of the mean. Data points 318 that fall within line 312 and fit 308, such as data points 316 and 328, may, in some embodiments, be considered statistically within reasonable bounds of the mean. Therefore, data groupings, such as groupings 316 and 326 may, in some embodiments, be considered data not indicative of a detected change from the modeled data.

In some embodiments, graph 350 may also include threshold line 338. Line 338 may correspond to any number of standard deviations from fit 308. For example, line 338 may correspond to three standard deviations from fit 308. Data points that fall within line 312 and line 338, such as data points 348, may correspond to data points outside of the statistically insignificant region, but not significant enough to be considered a detected change. For example, data points 348 may include some data points that exceed second standard deviation line 314, but are less than threshold line 348. However, persons of ordinary skill in the art will recognize that although line 338 has been used to indicate the predefined threshold for determining significant data points, any line corresponding to any threshold may be used. For example, line 314 may be used as the threshold value. In this scenario, some data points from data points 348 may be considered significant because they exceed line 314. As another example, in some embodiments, data points that exceed one standard deviation, such as data points 348, may be deemed significant or indicative of a change.

Data points 310 may, in some embodiments, correspond to a third grouping of data points that exceed the defined threshold indicated by line 338. Thus, data points 310 may be considered statistically significant because they exceed the threshold value defined by line 338. Persons of ordinary skill in the art will recognize however that any threshold may be used, and the threshold may be set by the user, the user device, the host device, and/or the server.

As an illustrative example of the data depicted within FIGS. 3A and 3B, a user may place a microphone within a room to determine an ambient level of noise. The microphone may detect data points, such as data points 306 of FIG. 3A, and this may be used to determine a model of the ambient noise within the room. In some embodiments, the microphone may then be kept in the same room, and used to detect any new sounds within the room. If a sound exceeds a predefined threshold from the determined ambient noise level, the sound may be determined to be significant, whereas sounds that are substantially within one or more standard deviations from the model of the ambient noise level and less than the threshold value may also be considered ambient noise.

Figure 4:
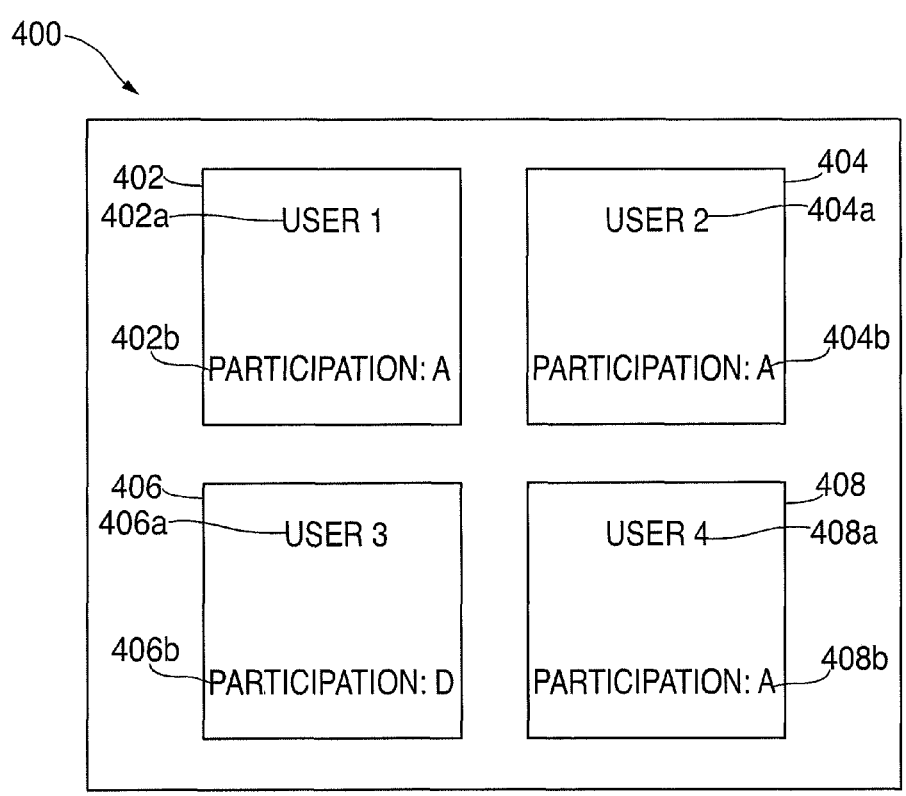
FIG. 4 is a schematic illustration of a display screen in accordance with various embodiments.

FIG. 4 is a schematic illustration of a display screen in accordance with various embodiments. Display screen 400 may include user report boxes 402, 404, 406, and 408. In some embodiments, display screen 400 may correspond to a user interface presented on an event administrator's device, such as host device 108 of FIG. 1. For example, the event administrator may correspond to a teacher of an online class. In this scenario, each user report box may correspond to a report box of a student accessing the online class. Persons of ordinary skill in the art will recognize that any number of user report boxes may be included within display screen 400, and the use of four (4) user report boxes is merely exemplary.

In some embodiments, each user report box may correspond to a separate user, or users, accessing the interactive online event monitored by the event administrator. For example, box 402 may correspond to a first user, whereas boxes 404, 406 and 408 may respectively correspond to a second user, a third user, and a fourth user. Each user may access the interactive online event remotely from different locations using separate user devices (e.g., user devices 104 of FIG. 1).

Each of user boxes 402, 404, 406, and 408 may include a user name and a participation grade for the corresponding user. For example, user box 402 may correspond to the first user and may have user name 402a "USER 1". Similarly, user name 404a may correspond to the second user, "USER 2", user name 406a may correspond to the third user, "USER 3", and user name 408a may correspond to the fourth user, "USER 4". Any user name may be used to correspond to a particular user. For example, a user may input a specific user name or handle to be displayed as their user name, or an email address, a social media network name, or any other suitable name, or any combination thereof may be used. In some embodiments, additional information may be displayed along with the user name. For example, a user may log into the online event using a social media network account profile. The server (e.g, server 102) may pull relevant information from the social media network profile and display some or all of the pulled information within a user's report box. In some embodiments, metadata corresponding to the user may be displayed within their user report box. For example, the server may determine a user's log-in location based on their user device's IP address, and may display the location within the user report box.

Each user report box may also include a participation grade. In some embodiments, the participation grade may be based on a user's level of participation within an event. For example, a student participating heavily within a class may receive a high participation grade. In some embodiments, the participation grade may be automated. For example, the server may assign a participation grade to a user based on the user's determined level of attentiveness. In some embodiments, participation grade 402b may correspond to USER 1's participation grade, whereas participation grade 404b, 406b, and 408b may each corresponds to USER 2, USER 3, and USER 4's participation grade, respectively.

Figure 5:
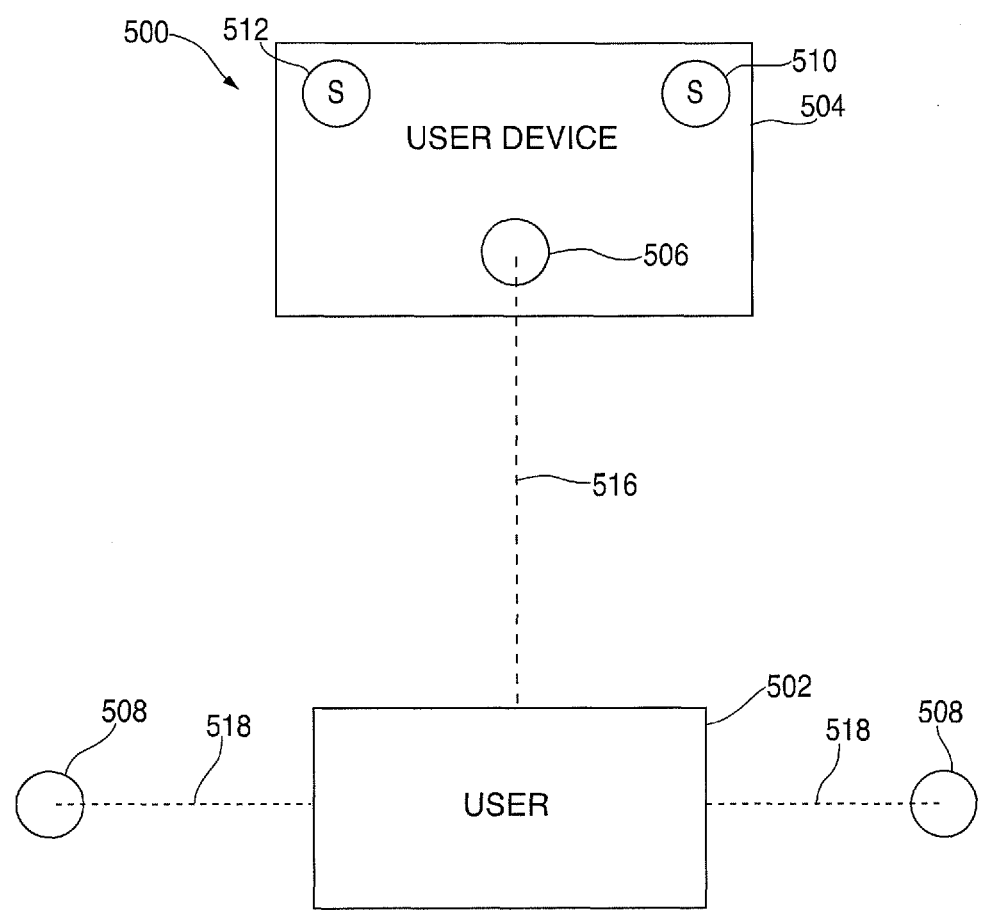
FIG. 5 is a schematic illustration of a system for detecting and monitoring audio communications in accordance with various embodiments.

FIG. 5 is a schematic illustration of a system for detecting and monitoring audio communications in accordance with various embodiments. System 500 may include user 502 and user device 504. In some embodiments, user device 504 may be substantially similar to user device 200 of FIG. 2, and the previous description of the latter may apply. In some embodiments, multiple instances of user device 504 may be included within system 500. For example, a first user device may be used to display images to user 502 whereas a second user device may be used to receive and/or output communications from/to user 502.

User device 504 may, in some embodiments, include communications receiver 506 and/or communications outputs 510 and 512. For example, communications receiver 506 may correspond to one or more microphones, transducers, and/or transducer arrays. Various types of microphones may include, but are not limited to, omnidirectional microphones, unidirectional microphones, cardioid microphones, bi-directional microphones, shotgun microphones, and/or boundary microphones. In some embodiments, multiple instance of receiver 506 may be included within or external to user device 504. In some embodiments, communications receiver 506 may correspond to one or more video capturing devices. For example, receiver 506 may correspond to a camera capable of capturing still images and/or video. In some embodiments, multiple instances of receiver 506 may be included, where one or more receivers may be operable to receive audio communications while one or more other receivers may be operable to receive video communications.

Communications outputs 510 and 512 may, for example, correspond to any speaker, set of speakers, transducer, transducer array, headset, or any other component capable of outputting communications. In some embodiments, communications receiver 506 and communications outputs 510 and 512 may be combined into a single component.

In some embodiments, system 500 may include additional communications receivers 508. For example, in addition to a first microphone placed in front of a user, a second and third microphone may be placed on either side of the user, orthogonal to the position of the first microphone but on opposing sides. Receivers 506 and 508 may, for example, each be placed at predefined distance and angles from the user. In some embodiments, communications receivers 508 may be substantially similar to communications receiver 506, and the previous description may apply. Furthermore, persons of ordinary skill in the art will recognize that although a three-microphone system is shown within system 500, any orientation, pattern, or setup of communications receivers may be used within the system, and the use of three microphones placed in a triangle pattern is merely exemplary. For example, one or more cardioid microphones may be placed in any suitable pattern around user 502 to capture a large amount of audio communications that may emanate from user 502.

In some embodiments, user 502 may communicate with user device 504 in the direction of transmission line 516. Transmission line 516 may, for example, correspond to the "line of sight" of the transmission coming from user 502 and directed towards user device 504. For example, a user may speak into their user device placed in front of them, and transmission line 516 may correspond to the direction of the user's audio signal.

In some embodiments, user 502 may communicate with receivers 508 in the direction of transmission lines 518. Transmission lines 518 may, for example, correspond to the "line of sight" of the audio signal outputting from user 502 in a direction of receivers 508. For example, while watching a video on their user device 504, user 502 may turn and speak into a cellular telephone located on their right hand side. The communication may be represented by transmission line 518.

Figure 6:
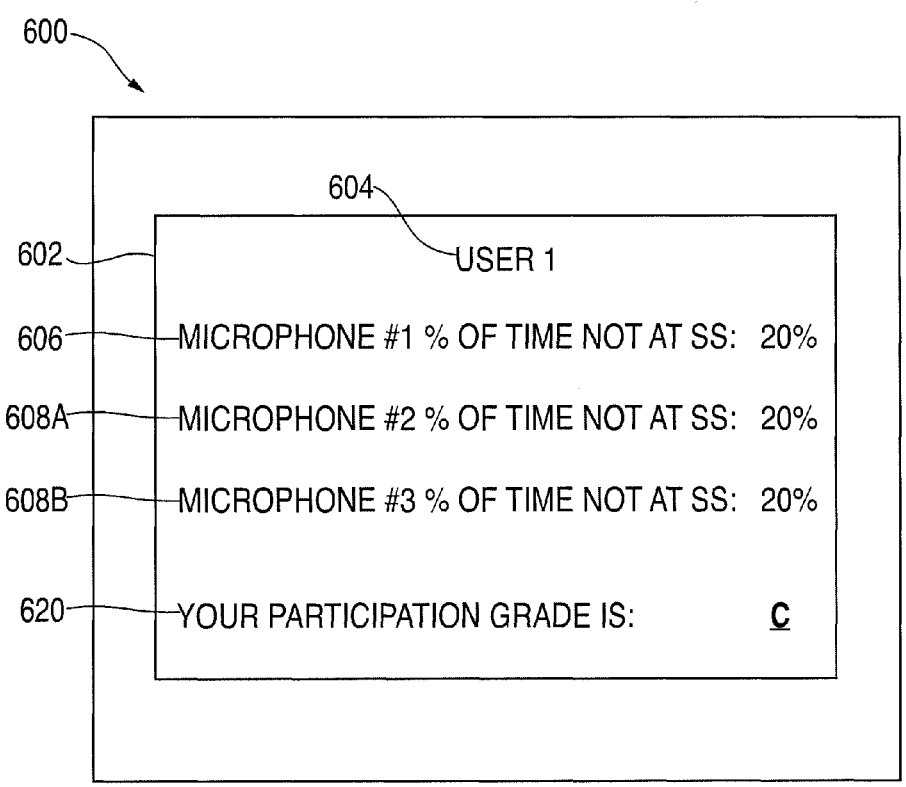
FIG. 6 is a schematic illustration of a display screen in accordance with various embodiments.

FIG. 6 is a schematic illustration of a display screen in accordance with various embodiments. Display screen 600 may include user interface 602, which may be displayed to an online participant accessing an event. For example, user 502 of FIG. 5 may be attending an online class, and user interface 602 may be displayed to the user on their user device (e.g., user device 504). In some embodiments, a user may be presented with user interface 602 at the end of an online event. For example, the user attending the online class may be presented within user interface 602 after the class has ended. In some embodiments, the interface 602 may present a user's participation report and grade for the event.

The participation report may correspond to a determined level of participation and/or attentiveness of the user during the online event. This may allow the server, or systems administrator, to provide participation grades to event attendees without having to physically monitor each one. In some embodiments, each participant may have one or more receivers located about them that may capture communications from the user. The communications may be monitored and analyzed against the online participant themselves (e.g., for feedback), as well as any other online participants, to determine if and when a participant has diverted attention away from the online event. For example, one or more receivers (e.g., receivers 506 and 508 of FIG. 5) may monitor an online participant of an online class. The one or more receivers may determine a steady state level of audio communication from the user and/or the ambient environment of the user. In some embodiments, one or more receivers of a receiver array may be located in a direction orthogonal to the direction of the user device. For example, receivers 508 may be located orthogonal to, and a certain distance away from, user device 504. Thus, in some embodiments, audio signal detected by receivers 508 may correspond to the user producing communications in the direction of transmission lines 518 directed at receiver 508. In this scenario, the user may be communicating in a different direction than transmission line 516 directed at user device 504, and therefore may not be interacting with the online event being broadcast thereon.

In some embodiments, user interface 602 may correspond to "USER 1" 604. User interface 602 may display USER 1's participation log based on the determined levels of attentiveness of the user. For example, indicator 606 may indicate a percentage of time that communications received by a first microphone was not at a predetermined steady state level. In this particular scenario, indicator 606 indicates that microphone 1 had not been at steady state levels for only 20% of the time of the online event. In some embodiments, microphone 1 may correspond to receiver 506 of FIG. 5, and therefore receiver 506 may have only received communications exceeding steady state levels for 20% of the time of the online event. Thus, this may correspond to the user communicating with user device 504 for 20% of the time.

Indicators 608A and 608B may indicate a percentage of time that microphones 2 and 3 may have not been at steady state levels. For example, microphone 2 may have exceeded steady state levels for 50% of the time of the online event, whereas microphone 3 may have exceeded steady state levels for 30% of the time of the online event. In some embodiments, microphones 2 and 3 may correspond to receivers 508. In this particular scenario, because the steady state levels at each of microphones 2 and 3 is greater than the level at microphone 1 (e.g., receiver 506), then the system may determine that user was not paying attention. This may be due, in part, to the fact that the received communications at receivers 508 was higher than that at receiver 506, which may be included within user device 504.

Thus, because the user's attention, based on the determined amount of time spent out of steady state levels at the orthogonal microphones, was greater than the amount of time captured at the microphone corresponding to the direction of the user device associated with the online event, the user may receive participation grade 620, corresponding to a "C". Persons of ordinary skill in the art, however, will recognize that any grade may be associated with any amount of time each of the microphones spends not at steady state levels, and the aforementioned is merely exemplary.

Figure 7A:
FIGS. 7A and 7B are schematic illustrations of various audio levels before and after a user joins a group in accordance with various embodiments.
Figure 7B:
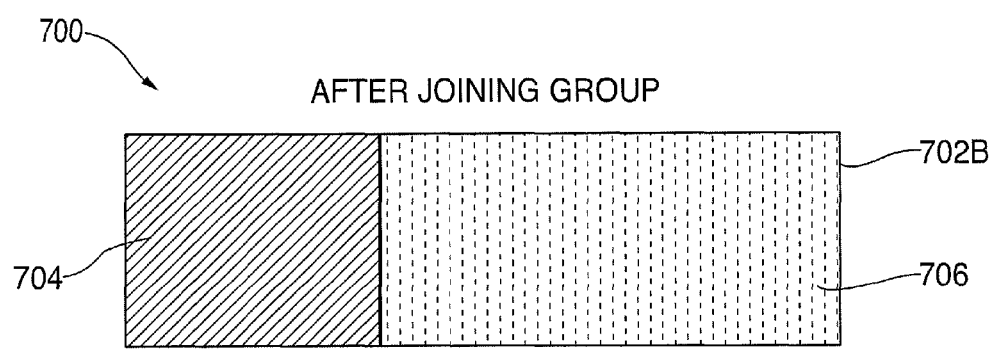

FIGS. 7A and 7B are schematic illustrations of various audio levels before and after a user joins a group in accordance with various embodiments. System 700 of FIG. 7A may represent a percentage of an online participant's received communications prior to joining a group. For example, prior to joining a group, an online participant's microphone(s) may be open, and may be capable of receiving audio from all participants and/or any presenters of an online event. For example, bar 702A may depict an amount of audio communications received from the online event prior to the user joining a group. As seen in bar 702A, prior to joining a group, substantially all of the participant's received communications may be received from the online event (e.g., event participants, presenters, etc.), as indicated by region 704.

Bar 702B of FIG. 7B, however, may display various amounts of audio communications received by an online participant after joining a group. For example, the online participant may still receive communications from the online event, as indicated by region 704 of bar 702B, however the online participant may also receive communications from the group, as indicated by region 706. In some embodiments, because the participant has joined the group, the communications received therefrom may be greater or more prominent than the communications received from the online event.

As an illustrative example, the user may be taking place in an online conference. Prior to joining a group, the user may be capable of receiving audio communications from the event administrator, presenter(s), and/or other participants in the general event forum. The user may, in some embodiments, join a group of other online participants within the event discussing a more focused topic. For example, the user may be interested in a specific panel occurring within the online conference. In this scenario, the user may still receive communications that were previously received prior to joining the group, however those communications may be lowered in volume. In some embodiments, communications may be transmitted to the user device at normal volume, or the volume with which they were received, and a flag or indication may be sent to the user indicating that some of the communications should be adjusted. For example, a user may receive all communications from an online class, but receive an indication that they should raise the volume of the teacher (or lower the volume of everyone but the teacher). In this way, the user may selectively decide which individuals are broadcasted at certain volume levels. Additional communications from the group itself may now occupy a larger percentage of the user's received communication because the group may now be the focus of the user's attention. In this scenario, upon entering the group, the group's communications may raise or be received at a higher volume level by the online participant than other communications (e.g., event communications). In some embodiments, one or more adjusters may be included within the background of the display screen. The adjusters may allow the user to adjust volume levels for specific aspects of the online event. For example, an adjuster may be included that allows the user to raise or lower the volume of the audience and/or the presenter.

Figure 8:
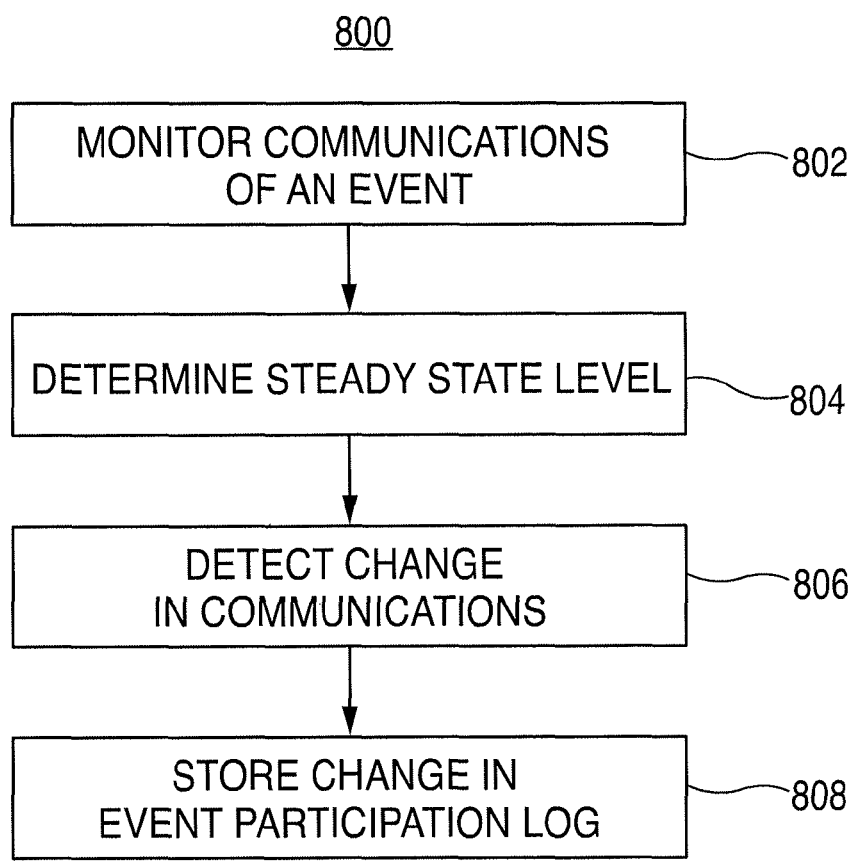
FIG. 8 is an illustrative flowchart of a process for storing changes within monitored communications in accordance with various embodiments.

FIG. 8 is an illustrative flowchart of a process for storing changes within monitored communications in accordance with various embodiments. Process 800 may begin at step 802. At step 802, communications within an event may be monitored. In some embodiments, the event may be an interactive online event where multiple online participants may communicate with one another. For example, students may log into an online classroom and may be presented with lecture materials from a teacher or from other students.

In some embodiments, a user's communications with their user device may be monitored. A user may be provided with multiple receivers capable of detecting communications directed substantially at them. For example, receivers 506 and 508 of FIG. 5 may be provided to detect communications from user 502. In some embodiments, the communications may be directed at receiver 506 located on or within user device 504. For example, receiver 506 may correspond to a microphone located in a user device, whereas receivers 508 may correspond to external microphones located proximate to the user. In some embodiments, each microphone in the system may be able to detect when audio is produced by the user, and the proportion of audio directed towards that particular microphone. For example, receivers 506 and 508 may be cardioid microphones, and each may be capable of detecting received audio. In some embodiments, audio directed substantially at microphone 506 may be detected peripherally by microphones 508. The system may be capable of detecting how much of the audio directed at microphone 506 is captured by microphones 508 to determine the user's intended direction of communication. For example, if a large percentage of the audio is detected by receivers 508, then the system may recognize that the user may not communicating with their user device, and may have their attention diverted elsewhere (e.g., a friend, video game, etc.).

In some embodiments, the user device may monitor the communications produced by the event or within a user's system (e.g., user device 504 and receivers 506 and 508). For example, microphones for each online participant accessing the event may be monitored individually and/or collectively. As another example, the user device may monitor the outputted communications from the user device's speakers to determine an amount of ambient noise produced by the event. This may help determine any contributing feedback noise that may occur by the receivers detecting audio produced by the event itself.

At step 804, a steady state level may be determined based on the monitored communications. The steady state level may correspond to a determined level of ambient noise within a particular region or area where the communications are being monitored. For example, receivers 506 and 508 may monitor the communications produced within system 500 for a period of time to determine an average amount of noise produced at each microphone or collectively. In some embodiments, the average amount of noise may reflect a typical amount of noise expected to be received by a microphone.

In some embodiments, the audio detected by the receivers may be modeled to determine an average amount of noise, or a steady state level of the noise. For example, data points 306 may be modeled using fit 308. Fit 308 may model the received communications. The model may allow the user and/or the system to have an estimation of a level of the noise that is detectable by a user device at any point in the future. Thus, an extrapolation to future time periods may be used to determine whether changes in the received communications occur.

At step 806, any changes in the monitored communications may be detected. The detected changes may correspond to communications that exceed expected communication levels based on the determined steady state level. For example, data points 310 of FIG. 3B may correspond to detected communications that exceed a predefined threshold for a steady state level (e.g., threshold line 338). In this particular scenario, data points 310 exceed line 338, which may correspond to a predefined threshold above the steady state level signified by fit 312. Fit 312 may, in some embodiments, be substantially similar to fit 308 of FIG. 3A, and line 338 may correspond to a particular number of standard deviations above the model fit. Thus, data points 310 may correspond to detected communications that exceed the determined steady state level by more than the predefined number of standard deviations.

In some embodiments, the detected change in the communications need only exceed the average level of communications based on a model fit of the monitored communications. For example, data points 348 may exceed fit 308, even though they may not exceed the predefined threshold indicated by line 338. In this particular scenario, data points 348 may be "detected" because the threshold has been set to fit 308 only. In some embodiments, the threshold may be set to one standard deviation line 312 or two standard deviation line 314.

At step 808, any detected change may be stored within an event participation log. The event participation log may be capable of storing each detected change, as well as when the change occurred and by how much the detected change exceeded the threshold value. For example, at 5 minutes after a teacher began to present their materials, a spike in audio communications from a certain online participant may have been detected. The timestamp and intensity level of the spike may be stored within the event participation log along with one or more additional pieces of data associated with the data spike.

In some embodiments, the detected change may be analyzed prior to being stored within the event participation log. For example, the detected change may be analyzed to determine which receiver detected the change. If the change was detected by a receiver located in the direction of expected event communications (e.g., receiver 506), this change may be classified as an event signal and therefore the user may be determined to be participating in the event. If, however, the change was detected by a receiver not located in the direction of any expected event communication (e.g., receivers 508), the change may be classified as a non-event signal. Non-event signals may signify that the user is not participating in the event, and therefore the system, host, or event administrator may determine that the user is not paying attention to the event and may therefore receive a lower participation score.

Figure 9:
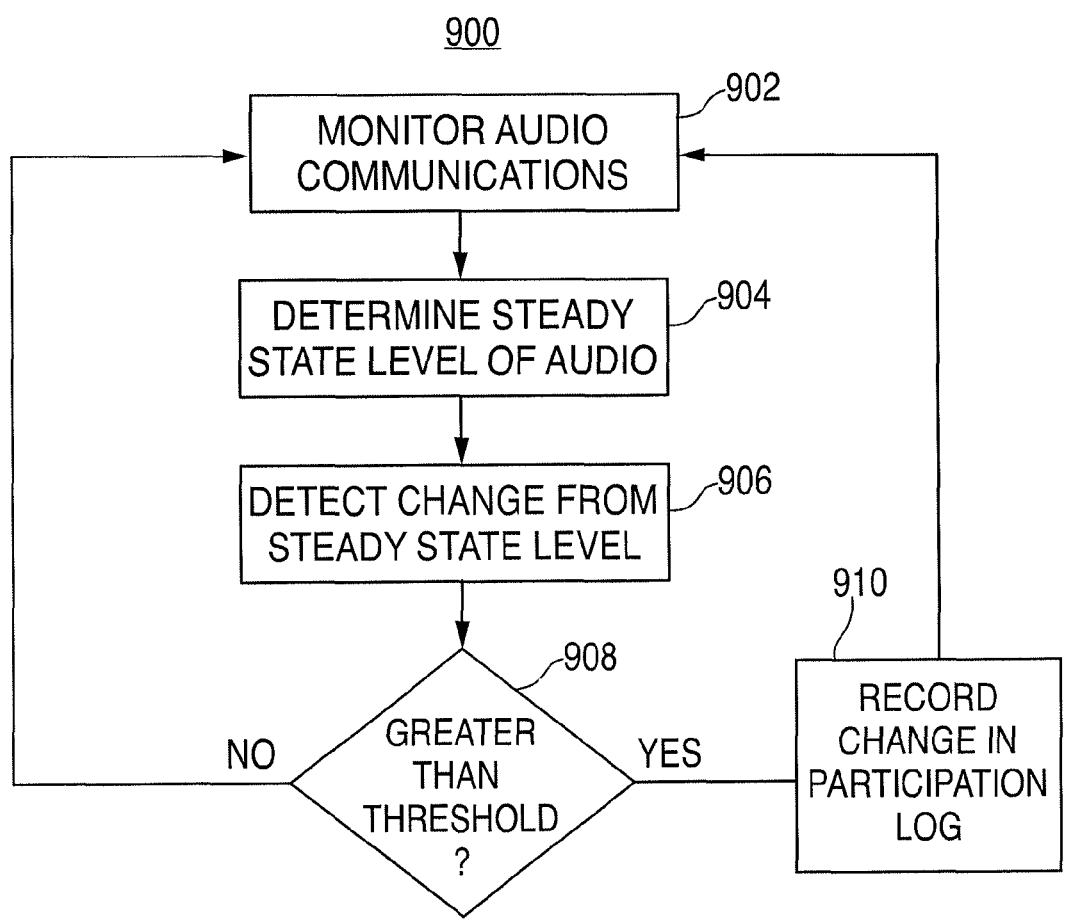
FIG. 9 is a illustrative flowchart of a process for determining changes within monitored communications in accordance with various embodiments.

FIG. 9 is a illustrative flowchart of a process for determining changes within monitored communications in accordance with various embodiments. Process 900 may begin at step 902. At step 902, audio communications may be monitored. At step 904, a steady state level of audio may be determined. At step 906, a change may be detected from the steady state level. In some embodiments, steps 902, 904, and 906 may be substantially similar to steps 802, 804, and 806 of FIG. 8, and the previous description of the latter may apply to the former.

At step 908, a query may be run to determine whether the detected change from the steady state level is greater than a threshold. For example, data points 310 may correspond to a detected change above line 338. In some embodiments, line 338 may correspond to a predefined threshold above a steady state level of the monitored communication (e.g., fit 308). The predefined threshold may correspond to any threshold level. For example, line 338 may correspond to three (3) standard deviations from a model fit of the data corresponding to a steady state level. Statistically speaking, three standard deviations from the mean corresponds to a 99.7% confidence interval. Thus, any data exceeding three standard deviations of would only have a 0.3% chance of not being a detected change. However, persons of ordinary skill in the art will recognize that any number of standard deviations may be used to determine the significance of a particular data point or grouping, and the use of three standard deviations is merely exemplary.

If, at step 908, the detected change is determined to be less than the threshold, process 900 may return to step 902 where audio communications may be monitored. In some embodiments, upon return to step 902, the detected change from step 906 may be used to dynamically update the steady state level. However, in some embodiments, after step 908, process 900 may return to step 906 where the process may wait to detect additional changes from the steady state level.

If, however, at step 908, the detected change is determined to be greater than the threshold value, process 900 may move to step 910. At step 910, the detected change from step 906 may be recorded in a participation log. In some embodiments, the participation log may store all activities related to one or more participants of an event. For example, the participation log may be used to determine participation grades for students accessing the online event. If a change is detected within a students monitored communications it may correspond to the user either actively participating in the event or the user not paying attention to the event (e.g., communicating with friends, playing video games, etc.).

In some embodiments, if the change is detected, one or more algorithms resident on the user device and/or the server may look to determine the user's activities at the time of the detected change. For example, the detected change may correspond to the user actively communicating with their user device and thus the event, or the detected change may correspond to the user engaging in one or more additional activities (e.g., video game, communicating with a friend), and therefore not participating in the event. Thus, in some embodiments, the one or more algorithms will look to see if the user provided one or more inputs to the event using their user device. If so, then it may be determined that user is participating in the event. However, if there are no noticeable event inputs or other indications that the user is interacting with the event, then the detected change may correspond to the user not participating in the event and the change may be flagged as a non-event signal.

Figure 10:
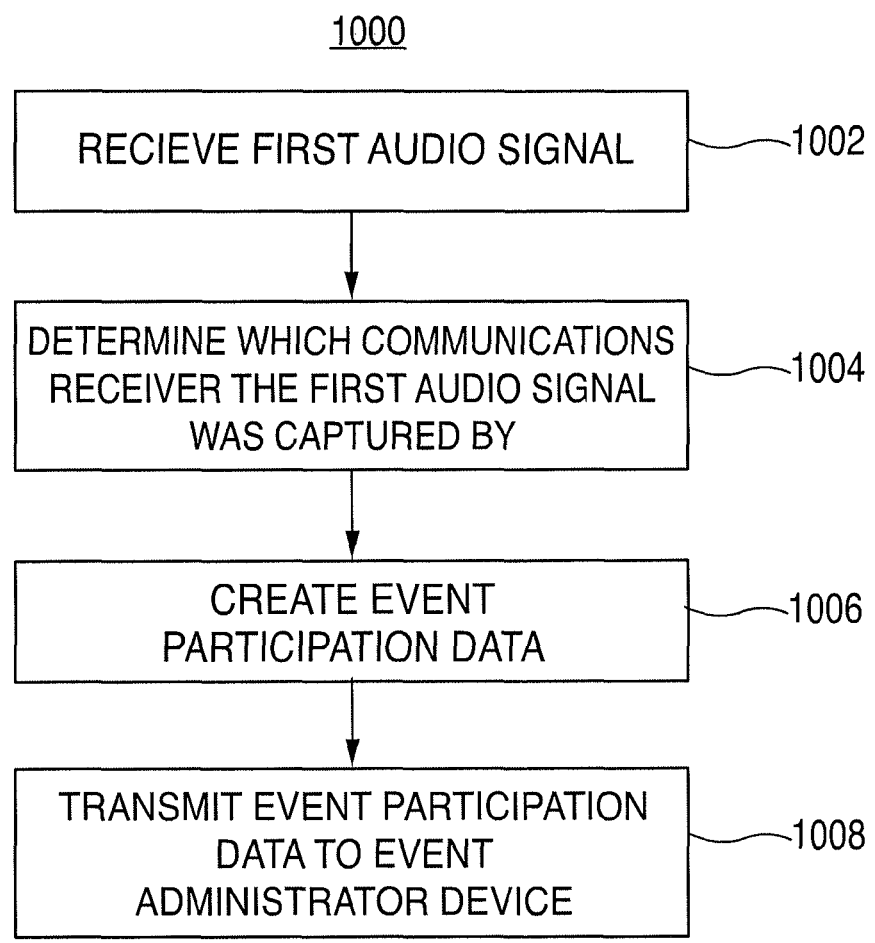
FIG. 10 is an illustrative flowchart of a process for transmitting event participation data to users in accordance with various embodiments.

FIG. 10 is an illustrative flowchart of a process for transmitting event participation data to users in accordance with various embodiments. Process 1000 may begin at step 1002. At step 1002, a first audio signal may be received at a first microphone or audio receiver. In some embodiments, a system, such as system 500 of FIG. 5, may include one or more communications receivers, such as receivers 506 and 508. Each receiver may be capable of receiving/detecting communications from a user, such as user 502. For example, receiver 506 may receive communications from user 502 via communications line 516.

At step 1004, a determination may be made as to which communications receiver captured the first audio signal. In some embodiments, the system may include multiple communications receivers set up to detect audio signals. For example, system 500 of FIG. 5 may include receiver 506 placed in front of user 502, as well as receivers 508 placed adjacent to user 502. Persons of ordinary skill in the art will recognize that any number of audio receivers, which may be oriented in any suitable configuration, may be used, and the use of three (3) receivers is merely exemplary.

At step 1006, event participation data may be created based on which receiver the communications has been captured by. Continuing the aforementioned example, if communications are received by receiver 506, event participation data corresponding to the user participating in the event may be created. Receiver 506 may, in some embodiments, correspond to a microphone included within, or substantially on, user device 504. In this particular scenario, communications received by receiver 506 may correspond to communications that are directed to the user device. Conversely, if communications are received by receivers 508, event participation data corresponding to the user not participating in the event may be created. Receivers 508 may, in some embodiments, be positioned substantially perpendicular and in-line with user 502. Thus, any communications detected by receivers 508 would correspond to user 502 being oriented substantially away from user device 504, and therefore not associated with the event.

At step 1008, the event participation data may be transmitted to the event administrator device. For example, data corresponding to a user's participation levels may be sent to the event administrator so that the event administrator may assign a participation grade to the user. In some embodiments, if the created event participation data corresponds to the user participating in the event (e.g., audio signal detected by receiver 506), then the event participation data sent to the event administrator may indicate that the user had been paying attention. However, if the event participation data indicates that the user was not participating in the event (e.g., audio signal detected by receivers 508), then the event administrator may assign a participation grade to the user reflective of the user not paying attention to the event.

Figure 11:
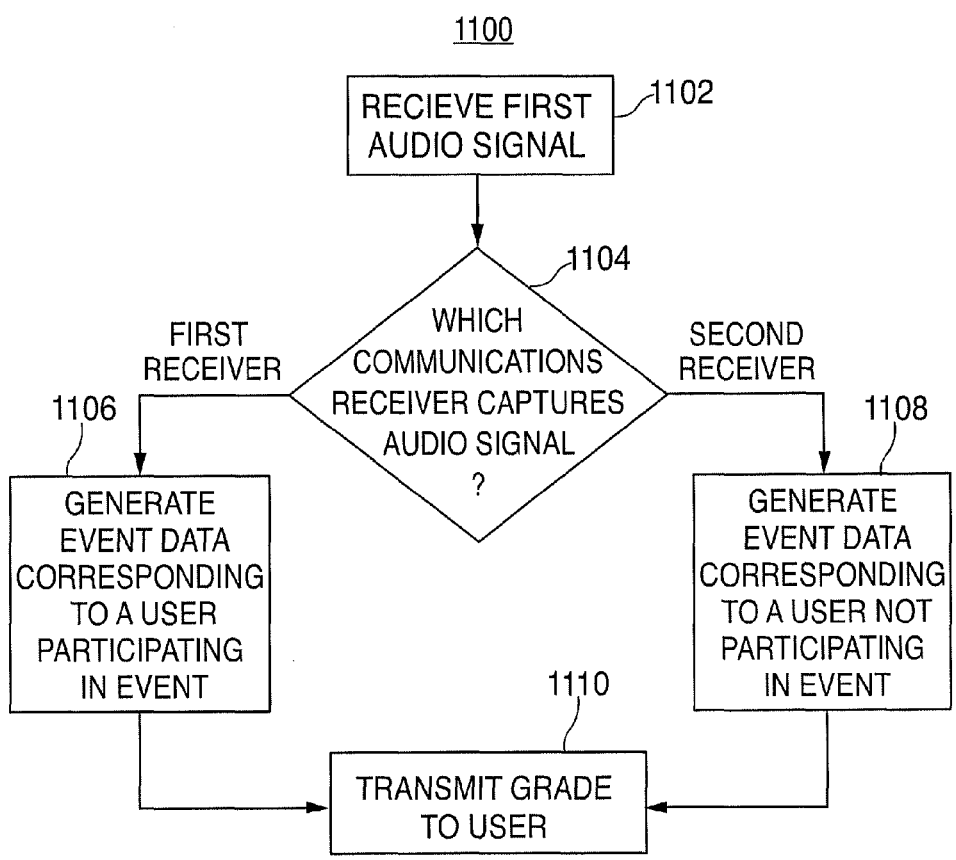
FIG. 11 is an illustrative flowchart of a process for transmitting grades to users in accordance with various embodiments.

FIG. 11 is an illustrative flowchart of a process for transmitting grades to users in accordance with various embodiments. Process 1100 may begin at step 1102. At step 1102, a first audio signal may be received by a communications receiver. For example, transmission line 516 of FIG. 5 may be received at communications receiver 506 on user device 504. In some embodiments, step 1102 of FIG. 11 may be substantially similar to step 1002 of FIG. 10, and the previous description of the latter may apply to the former.

At step 1104, a query may be run to determine which communications receiver from an array of communications receivers captured the audio signal. In some embodiments, the user may be surrounded by one or more communications receivers, such as microphones, which may be positioned in any suitable orientation. For example, user 502 of FIG. 5 may be positioned a first distance away from receiver 506, as well as being positioned a second distance away from receivers 508. As another example, various microphones may be equally positioned around a user in a circular manner. Persons of ordinary skill in the art will recognize that any microphone array may be used to obtain audio signals, and the various array type may also depend on the type of microphone used to obtain audio signals, and the aforementioned setups are merely exemplary.

In some embodiments, certain receivers capturing communications within the array may signify that a user is participating in an event, whereas others may signify that the user is not participating in the event. For example, if the user is asking a question to an event presenter, the user will most likely be directing his/her communications towards their user device. However, if the user is not participating in the event, then the user will most likely not be directing his/her communications towards their user device. For example, if the user is communicating with a friend, or interacting with a video game, then their communications will be directed elsewhere. These communications may be detected by one or more other communications receivers placed proximate to the user, but not in the line of sight of the user device.

If, at step 1104, it is determined that a first communications receiver, such as receiver 506, captures the audio signal, then process 1100 may proceed to step 1106. At step 1106, event data corresponding to the user participating in an event may be generated. In some embodiments, if the user communicates with their user device while accessing an online event using their user device, the communication detected by the device's microphone may correspond to event communications. For example, the user may be answering a teacher's question within an online event and may answer the question using their user device. In this particular scenario, the communications receiver located on the user device may detect the audio communications from the user, and generate event data indicating the user is participating in the event.

If, however, at step 1104, it is determined that a second communications receiver or receivers, such as receivers 508, capture the audio signal, then event data corresponding to the user not participating in the event may be generated. In some embodiments, if audio communications are received at microphones adjacent to the user but not located on or proximate to the user device, then the user most likely is not paying attention or participating in the event. For example, communications directed at receivers 508 may correspond to the user not interacting with an event on their user device. Thus, in this scenario, the user is most likely not participating in the event, and therefore event data corresponding to the user not participating may be generated.

The created event data may correspond to any indicator or flag signifying the user's participation level. For example, the generated event data may be a Boolean operator capable of reading "1" or "TRUE" if the event data generated corresponds to the user participating in the event. As another example, the generated event data may read "0" or "FALSE" if the event data generated correspond to the user not participating in the event. Persons of ordinary skill in the art will recognize that any event data may be generated, and the event data may be depicted in any suitable format, and the aforementioned scenario is merely exemplary.

After event data has been generated at either steps 1106 or 1108, process 1100 may proceed to step 1110. At step 1110, a grade may be transmitted to the user. In some embodiments, the grade may be based on the user's level of participation within the event. For example, if event data corresponding to the user participating in the event is created at step 1106, then the user may receive a higher participation grade than if the event data generated corresponded to the user not participating in the event. As an illustrative example, USER 4 of FIG. 4 may receive participation grade 408*b*, "A", which may indicate that the user has participated in the event, whereas USER 3 may receive participation grade 406*b*, "D", indicating that this user has not participated in the event.

In some embodiments, the grade for the event may be transmitted to the user at the end of the event. This may allow the system to determine an overall level of attentiveness for the user throughout the event's duration. In some embodiments, the grade may be transmitted to a user's parent or guardian instead of, or in addition to, the user. This may allow, for example, a teacher to communicate with a student's parent directly, instead of with the student, who may not convey the message to their parent.

Figure 12:
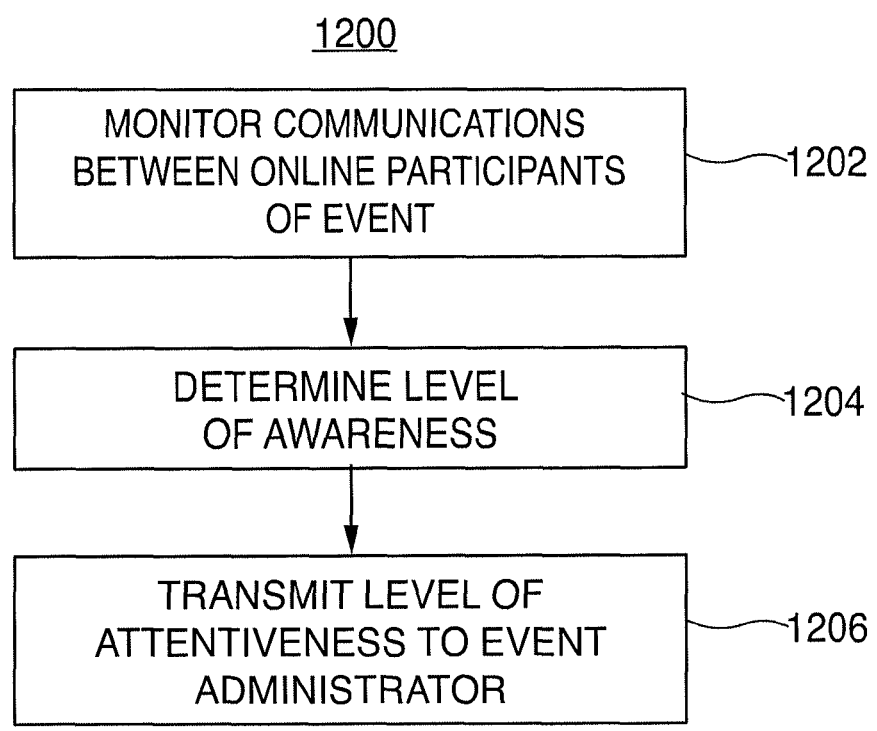
FIG. 12 is an illustrative flowchart of a process for transmitting a level of attentiveness to an event administrator in accordance with various embodiments.

FIG. 12 is an illustrative flowchart of a process for transmitting a level of attentiveness to an event administrator in accordance with various embodiments. Process 1200 may begin at step 1202. At step 1202, communications between online participants of an event may be monitored. For example, an online participant of an event may communicate with one or more additional online participants of the event within a group or subgroup. In some embodiments, the participants of the group may communicate with one another during the online event. For example, a first participant may ask a second participant a question about material presented within the event. The group may be formed between these two participants prior to the question being asked or in response to the question being asked.

In some embodiments, the communications between the online participants may be monitored by a system facilitating the communications. For example, a server may be able to facilitate communications between user devices accessing an online event hosted on the server. The server may be capable of monitoring each user device to detect communications transmitted and received in order to determine which user devices are in communication with each other.

At step 1204, a level of attentiveness for each online participant may be determined. The level of attentiveness may be based on any number of factors including, but not limited to, the duration of time of the communications between the online participants, the content involved in the communications, the participants involved in the communications, and/or any other factor, or any combination thereof. In some embodiments, the server may determine the level of attentiveness based on when the communications between the online participants began. For example, if at a certain point within a presentation the presenter began to describe a very complex topic, communications between participants may occur to help clarify the topic amongst the participants. Therefore, the monitored communications may indicate that the online participants are paying attention to the material but may also require additional explanations. This may help highlight to the presenter a need to clarify certain topics. In some embodiments, the presenter may transmit a video to each participant within the online event. During the video, two or more participants may begin communicating within a group. Based on the these communications, the system may determine that the two participants are not participating within the event because they are no longer watching the video and instead are communicating within one another.

At step 1206, the determined level of attentiveness may be transmitted to an event administrator. The event administrator may, in some embodiments, correspond to a teacher or presenter of the online event. For example, if the online event corresponds to an online class, then the event administrator may be a teacher. In some embodiments, the event administrator may receive the determined level of attentiveness for each online participant and based thereon, assign a participation grade to the participants. For example, if it is determined that the online participants have not been paying attention in the online class, these participants may receive a low participation grade. In some embodiments, the event administrator may store the level of attentiveness for each user within an event database. This may allow the event administrator to aggregate or analyze the level of attentiveness for various users to determine the users' grades, and/or ways or areas to augment their presentation to make it more engaging to the participants.

Figure 13:
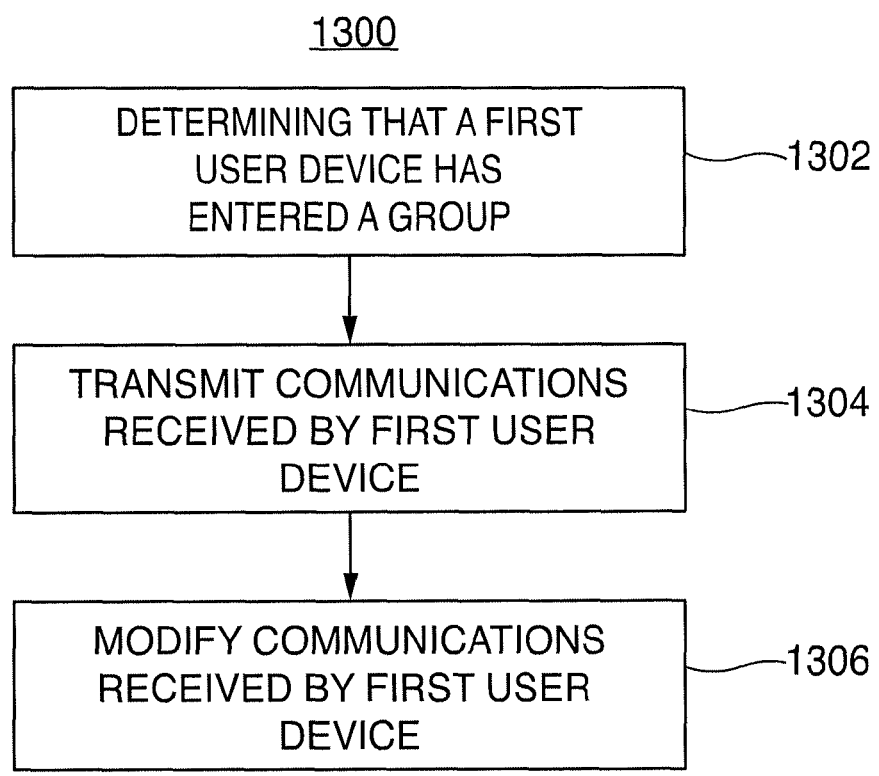
FIG. 13 is an illustrative flowchart of a process for modifying communications received by a user within a group in accordance with various embodiments.

FIG. 13 is an illustrative flowchart of a process for modifying communications received by a user within a group in accordance with various embodiments. Process 1300 may begin at step 1302. At step 1302, a determination may be made that a first user device has entered a group. In some embodiments, a first user accessing an online event may enter into a group of online participants within the online event. For example, a user may want to join a group including one or more participants accessing an online event. The user may select an option to join the group, request an invitation to enter the group, knock on the room of the group, or be brought in by another group member, or the user may join using any other suitable mechanism, or any combination thereof. In some embodiments, the user may be capable of entering the group without accessing the event, but may access the event after joining the group.

At step 1304, communications may be transmitting from the first user device to the group. For example, after a user enters a group within an online event, the user may begin to send communications to additional members of the group. In some embodiments, the user may be capable of transmitting audio, video, textual communications, documents, or any other form of communication, or any combination thereof, to the other group members. For example, the user may be able to transmit audio signals to additional group members.

At step 1306, communications received by the user may be modified in response to the user joining and transmitting communications to the group. In some embodiments, prior to joining the group, the user may have been capable of receiving communications solely from the event. For example, the mixture of audio received by the user prior to joining the group may have consisted of only the event's audio. After the user joins the group, the audio mixture received by the user may be split so that some audio is from the event and some audio is from the group. In this way, the user may perceive to be in a real group within the physical event where they would hear communications from group members while the event occurs in the background. In some embodiments, the system may automatically mix the group's audio and the event's audio to suitable levels such that the user appropriately hears both. Persons of ordinary skill in the art will recognize that any mixture of the group's communications and the event's communications may occur. For example, the mixture may be half group/half event, one third event/two thirds group, or any other partitioning, or any combination thereof. In some embodiments, the user may be able to "pause" the communications of the event as they enter the group. This may allow the user to receive the group's communications only, but still be able to receive the event's communications at a later point in time by un-pausing the communications from the event.

The various embodiments described herein may be implemented using a variety of means including, but not limited to, software, hardware, and/or a combination of software and hardware. The embodiments may also be embodied as computer readable code on a computer readable medium. The computer readable medium may be any data storage device that is capable of storing data that can be read by a computer system. Various types of computer readable media include, but are not limited to, read-only memory, random-access memory, CD-ROMs, DVDs, magnetic tape, or optical data storage devices, or any other type of medium, or any combination thereof. The computer readable medium may be distributed over network-coupled computer systems. Furthermore, the above described embodiments are presented for the purposes of illustration are not to be construed as limitations.

What is claimed is:

1. A method for assessing participant attentiveness within an interactive online event, the method comprising:
   receiving a first plurality of audio signals from a user device, the user device comprising a plurality of microphones arranged in a plurality of directions around the user device, wherein the microphones are located a certain distance away from the user device;
   determining, based on the first plurality of audio signals, a steady state sound level of communication, wherein determining a steady state sound level comprises modeling the first plurality of audio signals to determine a maximum likelihood function representative of the steady state sound level;
   receiving a second plurality of audio signals from the user device;
   determining, based on the second plurality of audio signals, a change from the steady state sound level of the second plurality of audio signals, wherein determining the change from the steady state sound level comprises determining that the change exceeds the steady state sound level by at least two standard deviations;
   determining, based on a microphone of the plurality of microphones having a largest contribution to the change, a level of attentiveness associated with the user device;
   storing the change in an event participation log; and
   providing a participation report corresponding to a determined level of participation and attentiveness of the user during the online event, wherein participation grades may be derived from the report and provided to event attendees.

2. The method of claim 1, wherein the event participation log is accessible by an administrator of the event.

3. The method of claim 1, wherein the event participation log is useable to grade the online participant.

4. The method of claim 1, wherein storing further comprises:
   recording a duration of the change from the steady state level.

5. A non-transitory computer readable medium containing instructions that, when executed by at least one processor of a computing device, cause the computing device to:
   receive a first plurality of audio signals from a user device, the user device comprising a plurality of microphones arranged in a plurality of directions around the user device, wherein the microphones are located a certain distance away from the user device;
   determine, based on the first plurality of audio signals, a steady state sound level of communication, wherein determining a steady state sound level comprises modeling the first plurality of audio signals to determine a maximum likelihood function representative of the steady state sound level;
   receive a second plurality of audio signals from the user device;
   determine, based on the second plurality of audio signals, a change from the steady state sound level of the second plurality of audio signals, wherein determining the change from the steady state sound level comprises determining that the change exceeds the steady state sound level by at least two standard deviations;
   store the change in an event participation log; and
   provide a participation report corresponding to a determined level of participation and attentiveness of the user during the online event, wherein participation grades may be derived from the report and provided to event attendees.

6. The non-transitory computer readable medium of claim 5, wherein the event participation log is accessible by an administrator of the event.

7. The non-transitory computer readable medium of claim 5, wherein the event participation log is useable to grade the online participant.

8. The non-transitory computer readable medium of claim 5, wherein storing further comprises:
   recording a duration of the change from the steady state level.

* * * * *